4 Sheets—Sheet 1.

J. SCHNEIDER.
Ice-House.

No. 203,651. Patented May 14, 1878.

Witnesses:
Edw. Schmidt.
Albert T. Beck.

Inventor:
John Schneider

J. SCHNEIDER.
Ice-House.

No. 203,651. Patented May 14, 1878.

UNITED STATES PATENT OFFICE.

JOHN SCHNEIDER, OF INDIANAPOLIS, INDIANA.

IMPROVEMENT IN ICE-HOUSES.

Specification forming part of Letters Patent No. 203,651, dated May 14, 1878; application filed January 3, 1878.

*To all whom it may concern:*

Be it known that I, JOHN SCHNEIDER, of Indianapolis, in the county of Marion and State of Indiana, have invented certain new and useful Improvements in Construction of Fermenting and Ice Houses for Beer, &c.; and I do hereby declare that the following is a full, clear, and exact description thereof, which will enable others skilled in the art to which it pertains to make and use the same, reference being had to the accompanying drawings, and to the letters of reference marked thereon, which form a part of this specification.

The object of my invention is to improve the construction of fermenting and ice houses of the buildings used for the manufacture of beer and other malt liquors; and it consists in the construction and arrangement of flues and ducts with suitable valves or dampers, by which the temperature as well as the ventilation of the fermenting-room can be regulated, while the ice in the ice-room is better preserved from melting too rapidly.

It also consists in an arrangement of gutters and troughs, by which the drippings of the sweat or condensed water from the gutters is carried off, all of which will be more fully described in the following specification, reference being had to the accompanying drawing, in which—

Figure 1:
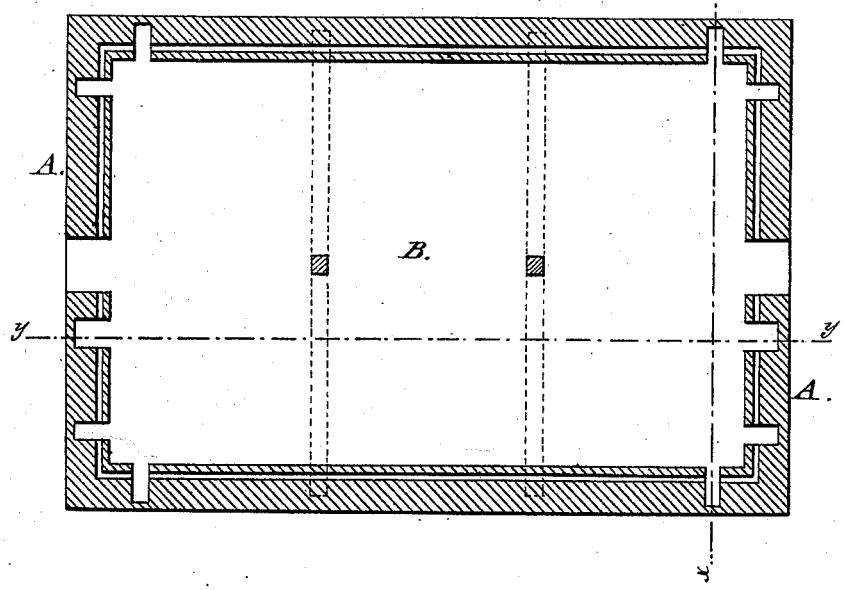
Figure 2:
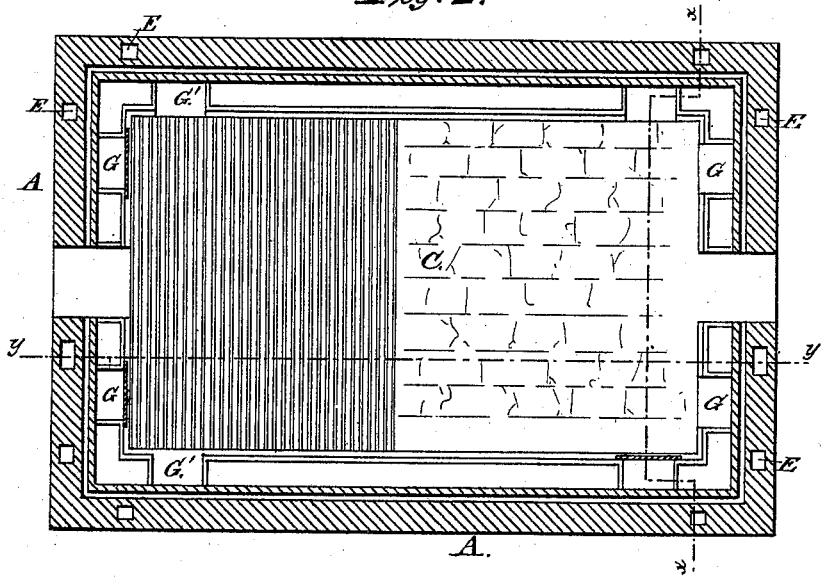
Figure 3:
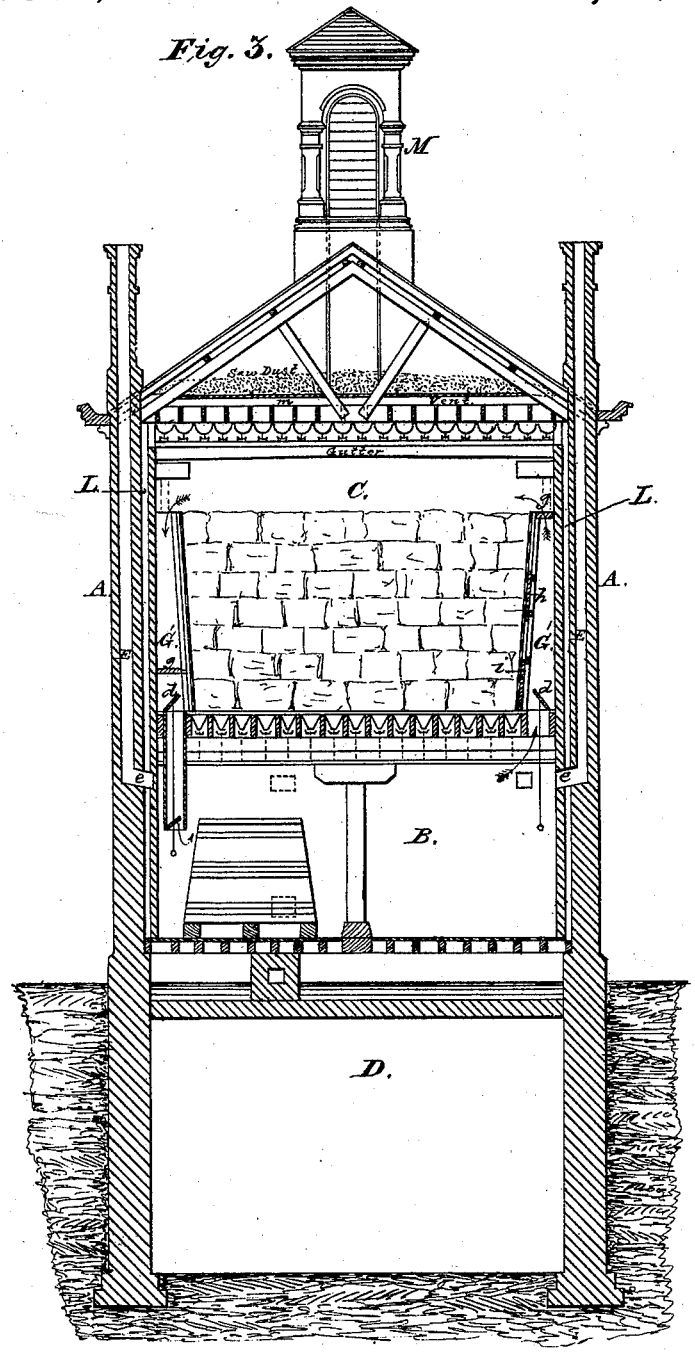
Figure 4:
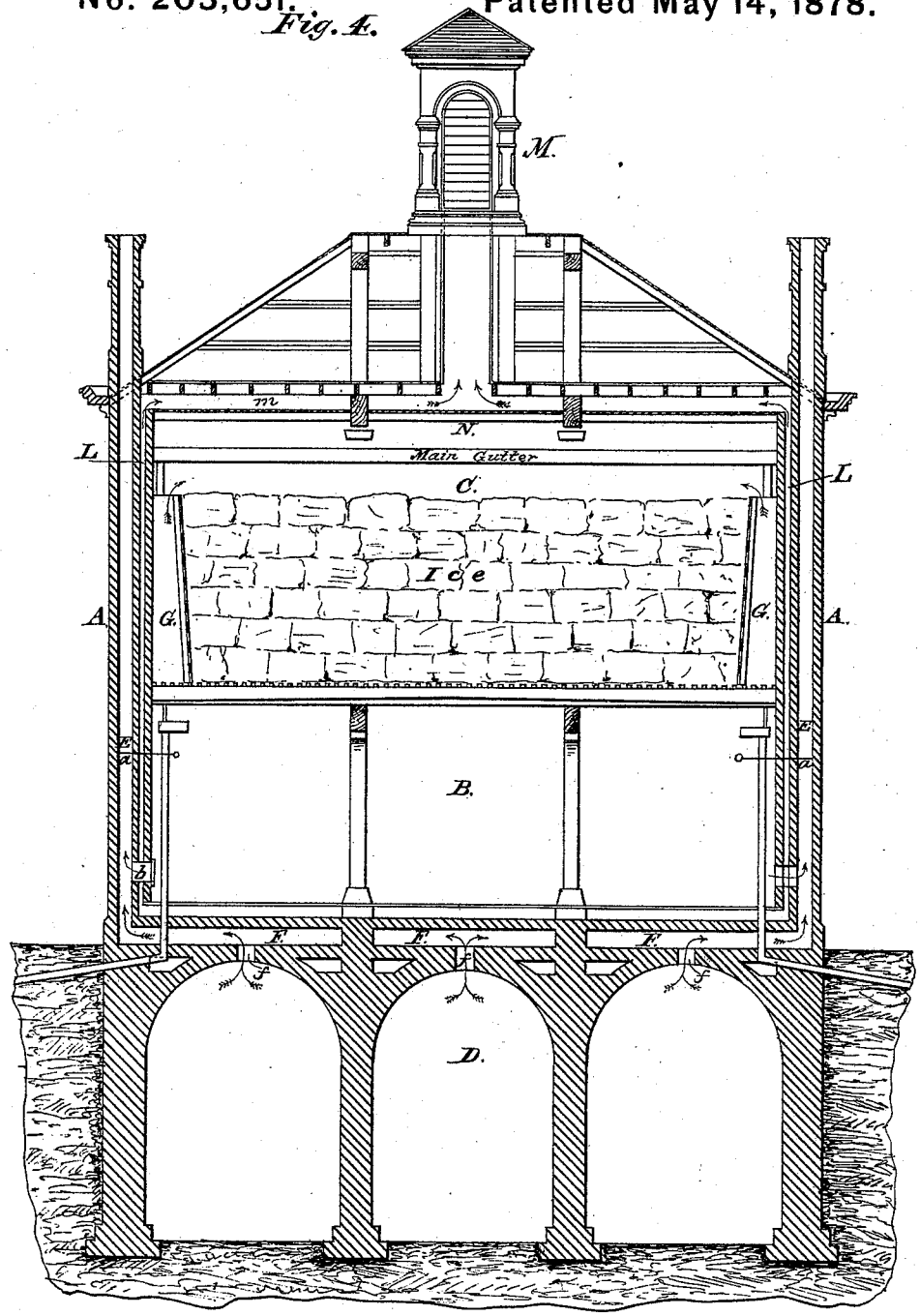
Figure 5:
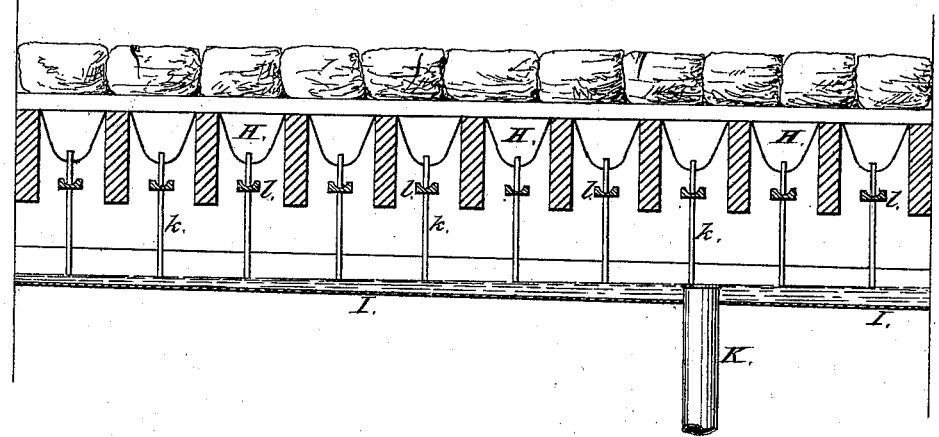
Figure 6:
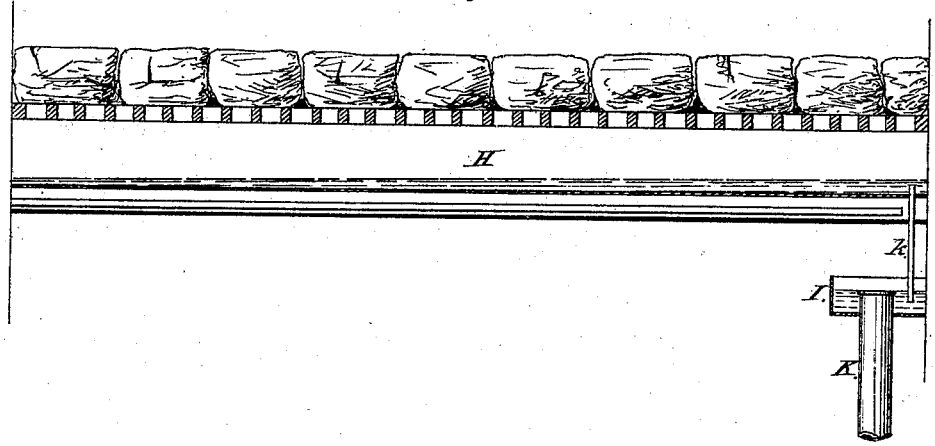

Figure 1 is a plan view of the fermenting-room. Fig. 2 is a plan view of the second story or ice-room. Fig. 3 is a vertical cross-section on line $x\ x$. Fig. 4 is a vertical cross-section on line $y\ y$. Figs. 5 and 6 are enlarged detail views, showing the arrangement of gutters.

In the drawings, A represents the outer or main walls of the building, in which B is the fermenting-room, C the ice-room, and D the cellar. In the walls of this building are arranged the flues E, with ducts or openings $e$ near the ceiling and floors, to draw off the foul air and gases. Suitable dampers or valves are arranged in the ducts to close or open them, as desired. Below the floor of the fermenting-room are the horizontal flues F, connecting with the flues E and, by ducts $f$, with the cellar, by which the foul air and gases are carried off from the cellar. In the flues E, slides or dampers $a$, near the ceiling of the fermenting-room, allow the foul air to escape when opened, and ventilate it; and by opening the slides or dampers $b$, near the bottom, the carbonic-acid gas produced by the fermenting process escapes. By closing the dampers $a\ b$ the cellar is shut off from any heavy outside atmosphere.

Above the fermenting-room is arranged the ice-room, provided with a slatted floor, under which metal gutters are arranged between the joists, and serve to collect the water of the ice as it melts. These gutters must be sufficiently inclined to lead off the water through small pipes $k$ at the ends of the gutters, and the pipes project about one and a half inch above the bottom of the gutters H, so that there will be always about one inch of ice-water in them.

The surplus water flows through the pipes $k$ into the main gutters I, into which they descend to within one inch of their bottom, so that the outlet will be always covered with water to exclude the air from the ice-room. The main gutters are placed on the ends of the building, and must also be inclined sufficiently to collect the water, which is carried off to any desired place by the spout K, so that the ice-water may be used for cooling off the beer, &c. The spout K passes up into the main gutters about three inches, so as to have the bottom of said gutters always covered with ice-water. The object of keeping the water in the gutters is to cool the air in the fermenting-room; and as there will be always a flow of running water in them, a current or movement of air will be created, which will draw off the carbonic-acid gas in the room.

To collect the sweat of the gutters H, occasioned by condensation, small troughs, preferably of wood, are arranged below them, which also empty their contents into the main gutters. The ceiling N of the ice-room is made of corrugated metal, and by it the moisture is collected. Below the corrugations are also arranged small wooden troughs $n$, which carry the condensed water into the main gutters, and thence it is led off by similar spouts, as in the fermenting-rooms.

In the sides of the ice-room are arranged the flues G G', which are provided with doors or valves $d\ g$, and in the sides of the ice-receiver with doors or valves $h$ and $i$. The valves h and i are arranged in the sides of the ice-receiver, so that the air may be taken always from the surface of ice as it melts, the upper one being opened first. On two sides of the ice-room the flues G' extend from near the ceiling to at least one foot below the top of the fermenting-tubs in the room B, so as not to injure the process of fermenting, and they serve to admit cold air from the ice-room when the doors or valves in the flues are opened. If the doors d and g are opened in the flues G, the warm air of the fermenting-room or cellar is drawn off and is cooled on top of the ice, and after cooling it descends again into the fermenting-room or cellar through the flues G'. When the ice is melted down below the door g, the door h, and lastly the door i, is opened, so that the warm air always comes on top of the ice. A small space or flue, L, is arranged in the outer or main walls of the building, so as to make them hollow; and, if desired, it may be filled in with sawdust or other suitable non-conducting material. The object of the flue L, with its ducts m, is to use it interchangeably with the flue E in different kinds of weather; and when it is desirable to exclude the external air, as in heavy or damp weather, this space is ventilated by the ducts m, which lead to the large ventilator M in the roof.

The advantages of my invention are, that the rooms are all thoroughly ventilated, and the temperature can be regulated as desired. The ice is much better preserved from melting, and a great saving of ice thereby obtained. The sweat caused by condensation will be prevented from dripping into the ice or rooms. It can be constructed at a very moderate cost, and can be easily applied to buildings for this purpose.

Having thus described my invention, what I claim, and desire to secure by Letters Patent, is—

1. In a building for the manufacture of malt liquors, the ice-room C, provided with flues G G', having dampers or valves d g in the body of the flues and dampers h i in the sides of the flues, all constructed and arranged as shown, and for the purpose specified.

2. In a building for the manufacture of malt liquors, the combination of the fermenting-room B with the ice-room C, provided with flues G G', having dampers d g in the body of the flues, and dampers h i in the sides of the flues, all constructed and arranged as shown, and for the purpose described.

3. In a building for the manufacture of malt liquors, the wooden troughs l, in combination with the gutters H, pipes k, main gutters I, and spouts K, constructed and arranged substantially as shown, and for the purpose set forth.

4. In a building for the manufacture of malt liquors, the fermenting-room B and ice-room C, having the flue E, provided with suitable ducts and dampers, and made interchangeable with the space or flue L, provided with ducts m, and connected to ventilator M, all constructed and arranged as shown and herein specified.

In testimony that I claim the foregoing as my own I hereby affix my signature in presence of two witnesses.

JOHN SCHNEIDER.

Witnesses:
EDW. SCHMIDT,
ALBERT T. BECK.